US008380418B2

(12) United States Patent
Bae et al.

(10) Patent No.: US 8,380,418 B2
(45) Date of Patent: Feb. 19, 2013

(54) METHOD FOR MAINTAINING A BRAKE ROTOR

(75) Inventors: Hong S. Bae, Sterling Heights, MI (US); Mark N. Howell, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 552 days.

(21) Appl. No.: 12/547,536

(22) Filed: Aug. 26, 2009

(65) Prior Publication Data

US 2011/0054758 A1    Mar. 3, 2011

(51) Int. Cl.
*G06F 17/00* (2006.01)
(52) U.S. Cl. .......................................... 701/92
(58) Field of Classification Search ............... 701/36, 701/90–92, 70–71; 188/79.51, 9.52
See application file for complete search history.

(56) References Cited

U.S. PATENT DOCUMENTS

| | | | |
|---|---|---|---|
| 6,318,518 B1 * | 11/2001 | Shinohara et al. | 188/264 AA |
| 6,631,791 B2 | 10/2003 | Moore et al. | |
| 6,804,598 B2 * | 10/2004 | Eckert et al. | 701/71 |
| 7,523,811 B2 | 4/2009 | Pacchiana et al. | |
| 2003/0216849 A1 | 11/2003 | Eckert et al. | |
| 2008/0236269 A1 | 10/2008 | Howell et al. | |

FOREIGN PATENT DOCUMENTS

| | | |
|---|---|---|
| DE | 4235364 A1 | 4/1994 |
| DE | 19713561 A1 | 5/1998 |
| DE | 10025127 A1 | 11/2001 |
| DE | 10219067 A1 | 11/2003 |
| DE | 102008015288 A1 | 4/2009 |

* cited by examiner

*Primary Examiner* — Yonel Beaulieu
(74) *Attorney, Agent, or Firm* — Quinn Law Group, PLLC

(57) ABSTRACT

A disc braking system of a vehicle determines the actual temperature of a brake rotor. The disc braking system compares the actual temperature of the brake rotor to a critical temperature of the brake rotor. The critical temperature of the brake rotor is a temperature above which damage and/or warping to the brake rotor may occur. The disc braking system applies a corrective measure to prevent damage to the brake rotor when the actual temperature of the brake rotor is greater than the critical temperature of the brake rotor. The corrective measure may include, but is not limited to: displaying a warning, adjusting a fraction control system of the vehicle, scheduling maintenance for the vehicle.

15 Claims, 3 Drawing Sheets

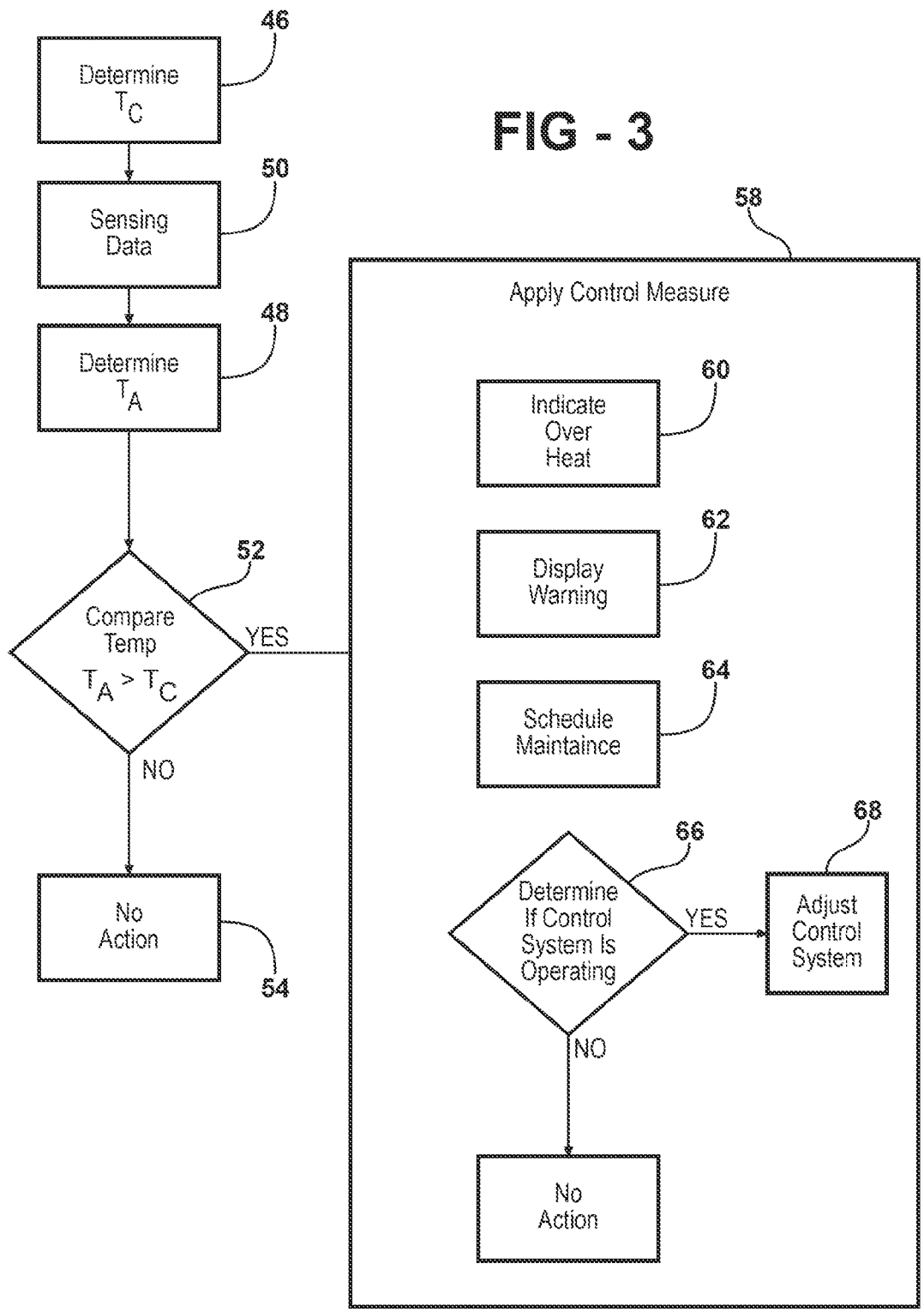

METHOD FOR MAINTAINING A BRAKE ROTOR

TECHNICAL FIELD

The present invention generally relates to a brake rotor for a disc braking system of a vehicle, and more specifically to a method of maintaining the brake rotor.

BACKGROUND OF THE INVENTION

Disc braking systems operate to slow or stop a vehicle. The disc braking system includes a brake rotor, i.e., a friction disc, rotatably coupled to at least one of the wheels of the vehicle. A caliper secures a pair of brake pads adjacent opposing sides of the brake rotor. Upon application of the disc braking system, the brake pads are forced into frictional engagement with both sides of the brake rotor to generate friction therebetween. The friction generated by application of the brake pads slows and/or stops the brake rotor, thereby slowing and/or stopping the wheel attached thereto.

The friction generated by application of the brake pads to the brake rotor converts the rotational energy of the wheel into heat. Accordingly, the brake rotor is subject to high temperatures generated during operation of the disc braking system. Excessive overheating of the brake rotor or repeated and/or prolonged exposure to the high temperatures generated during application of the disc braking system may lead to the brake rotor warping. Warping of the brake rotor may reduce the effectiveness of the disc braking system and lead to undesirable vibration in the vehicle.

SUMMARY OF THE INVENTION

The present invention provides a method of maintaining a brake rotor of a disc braking system of a vehicle. The method includes determining an actual temperature of the brake rotor; comparing the determined actual temperature of the brake rotor to a defined critical temperature of the brake rotor to determine which of the actual temperature of the brake rotor and the critical temperature of the brake rotor is greater; and applying a corrective measure to prevent damage to the brake rotor when the actual temperature of the brake rotor is greater than the critical temperature of the brake rotor.

The present invention also provides a vehicle. The vehicle includes a disc braking system. The disc braking system includes a brake rotor. The disc braking system further includes at least one sensor configured for sensing data related to the disc braking system. The disc braking system further includes a computer in communication with the at least one sensor. The computer includes software operable thereon, and is configured for receiving the sensed data related to the disc braking system. The software processes the sensed data to compare an actual temperature of the brake rotor with a critical temperature of the brake rotor. The computer applies a corrective measure to reduce the actual temperature of the brake rotor to below the critical temperature of the brake rotor to prevent damage to the brake rotor when the actual temperature of the brake rotor is greater than the critical temperature of the brake rotor.

Accordingly, the disc braking system monitors the actual temperature of the brake rotor and compares the actual temperature of the brake rotor with the critical temperature of the brake rotor. When the actual temperature of the brake rotor rises above the critical temperature of the brake rotor, the disc braking system applies a corrective measure to reduce the actual temperature of the brake rotor to below the critical temperature of the brake rotor, thereby preventing excessive overheating of the brake rotor or prolonged exposure of the brake rotor to high temperatures to prevent warping of the brake rotor. The effectiveness of the disc braking system is maintained and the life expectancy of the brake rotor is extended by preventing possible warpage to the brake rotor.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a flowchart showing the steps of a method of maintaining a brake rotor of a disc braking system.

DESCRIPTION OF THE PREFERRED EMBODIMENTS

Figure 1:
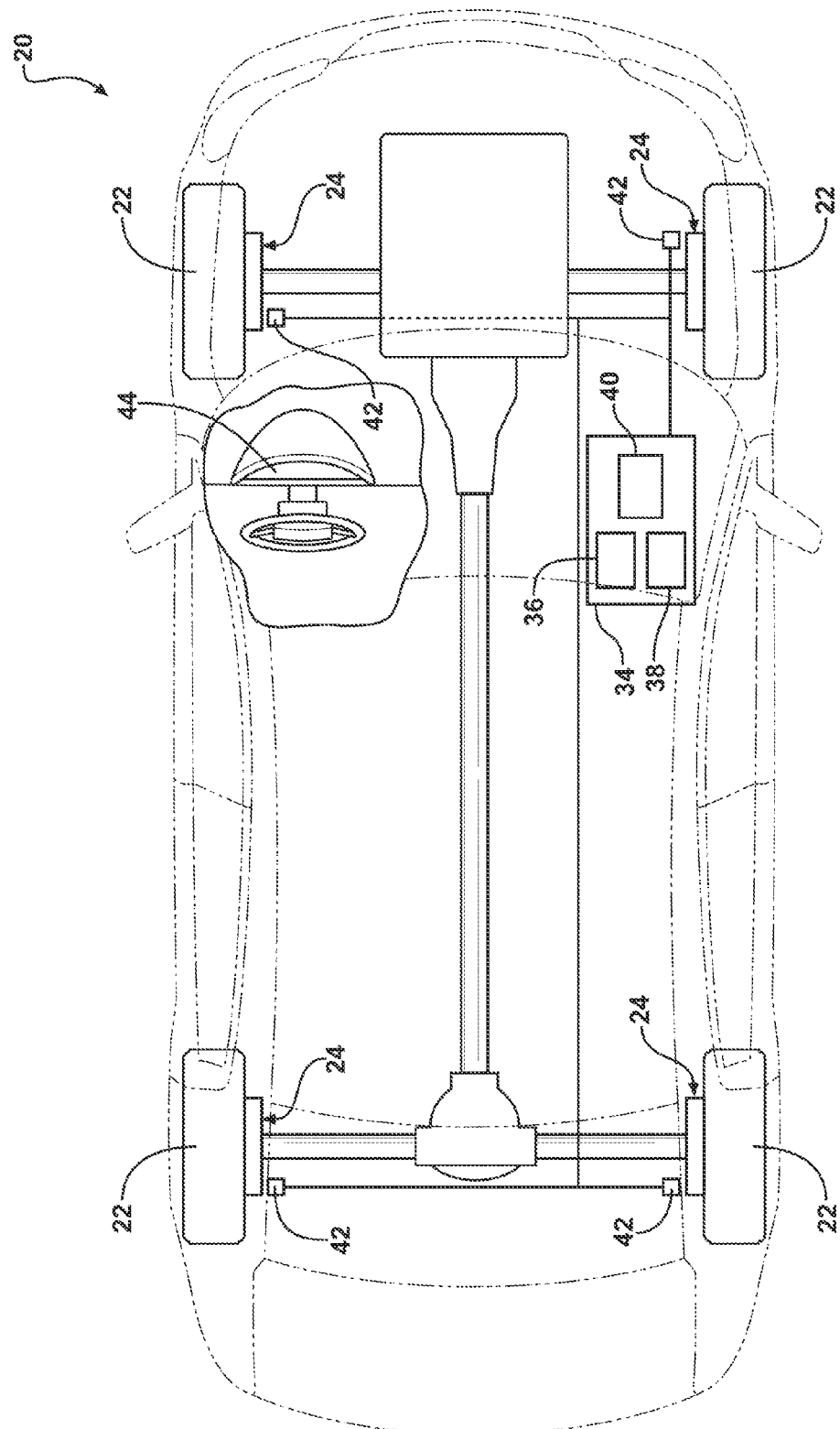
FIG. 1 is a schematic diagram of a vehicle.

Referring to FIG. 1, wherein like numerals indicate like parts throughout the several views, a vehicle is shown generally at 20.

The vehicle 20 comprises at least one wheel 22 having a disc braking system 24 attached thereto. As shown, the vehicle 20 includes four wheels 22. However, it should be appreciated that the vehicle 20 may have any number of wheels 22. The disc braking system 24 is operable to slow and/or stop rotation of the wheels 22 to which it is attached.

Figure 2:
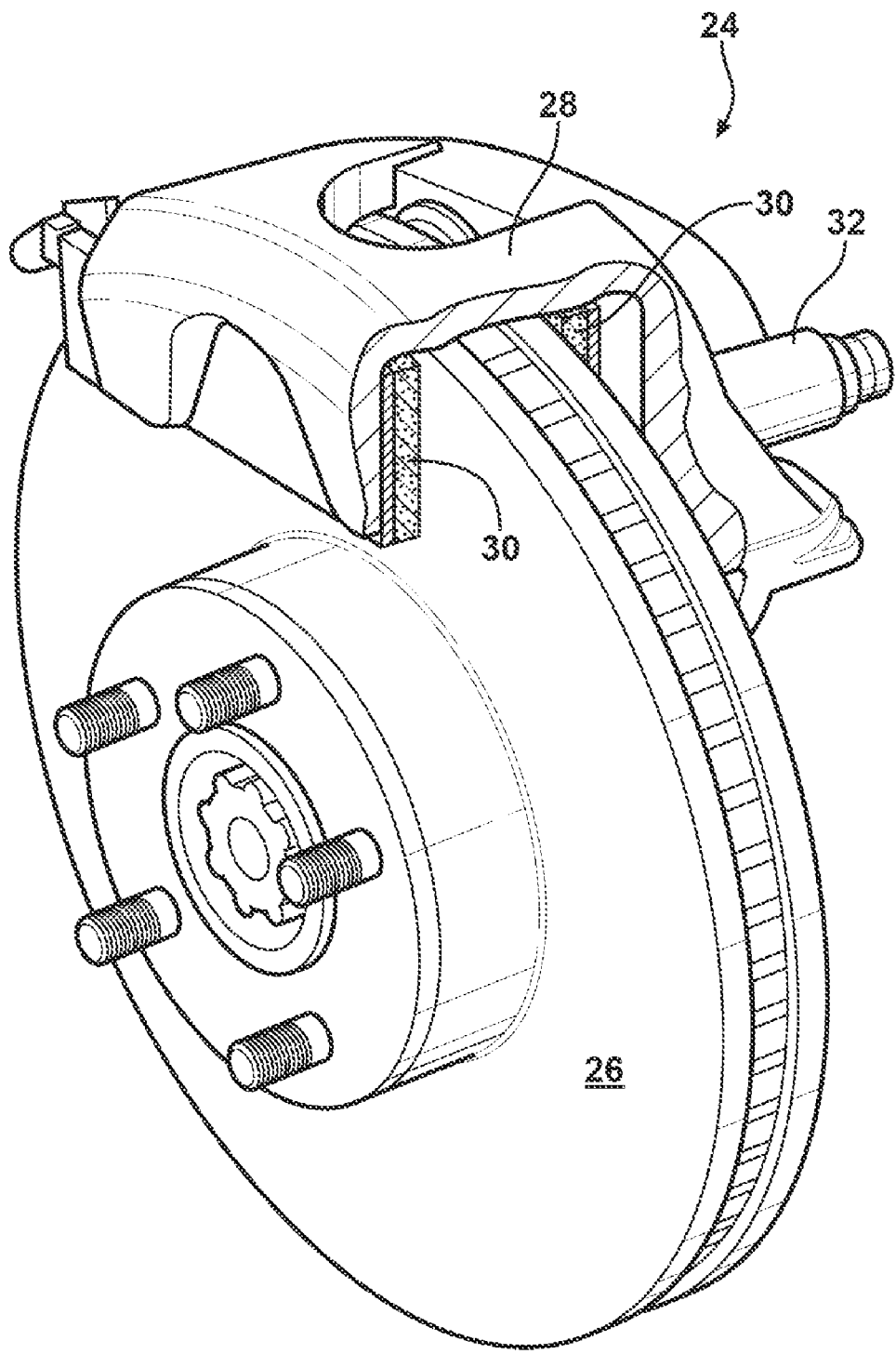
FIG. 2 is a schematic perspective view of a disc braking system of the vehicle.

Referring also to FIG. 2, the disc braking system 24 includes a brake rotor 26. The brake rotor 26 is attached to the wheel 22 for rotation with the wheel 22. The brake rotor 26 presents opposing parallel side surfaces as is well known. The disc braking system 24 further includes a brake caliper 28. The brake caliper 28 is attached to the vehicle 20, and supports a pair of brake pads 30 adjacent each of the opposing sides of the brake rotor 26, i.e., one brake pad 30 is disposed adjacent each of the opposing side surfaces of the brake rotor 26. The disc braking system 24 further includes an actuator 32. The actuator 32 urges the brake pads 30 into frictional engagement with the opposing side surfaces of the brake rotor 26 to slow and/or stop rotation of the brake rotor 26 and thereby slow and/or stop the wheel 22. The actuator 32 may include a hydraulic actuator, a pneumatic actuator, an electric actuator, or some other device capable of moving the brake pads 30 into frictional engagement with the brake rotor 26.

The frictional engagement of the brake pads 30 with the brake rotor 26 during operation of the disc braking system 24 generates a high level of heat. The brake rotor 26 absorbs much of this heat, raising the temperature of the brake rotor 26. The brake rotor 26 may include and be manufactured from any suitable material, such as a steel material, a ceramic material, or some other material suitable for use as a brake rotor 26. The brake rotor 26 includes a critical temperature. The critical temperature is the temperature above which the brake rotor 26 may be damaged, i.e, the brake rotor 26 may be damaged if the actual temperature of the brake rotor 26 repeatedly rises above the critical temperature or rises above the critical temperature to an extremely high or excessive level. Damage to the brake rotor 26 may include, but is not limited to, warping of the brake rotor 26, cracking of the brake rotor 26, excessive wear of the brake rotor 26, or some other damage that impairs the proper operation of the brake rotor 26 within the disc braking system 24. The critical temperature is dependent upon the specific material utilized for the brake rotor 26, and may be set at a level to provide a sufficient safety factor if so desired.

The disc braking system 24 further includes a computer 34. The computer 34 includes a processor 36, a memory 38 and software 40 operable thereon as is well known in the art. The computer 34 may include a separate computer dedicated to the disc braking system 24, or alternatively may include a vehicle controller responsible for controlling several different systems and operations of the vehicle 20.

The vehicle 20 includes at least one sensor 42 configured for sensing data related to the disc braking system 24. The vehicle 20 may include several sensors 42 that sense data related to the disc braking system 24, as well as sense data for other control systems of the vehicle 20. Accordingly, the sensors 42 may provide data for several different control systems of the vehicle 20, such as a stability control system, a traction control system, an anti-lock braking system, a trailer tow monitoring system, etc. The at least one sensor 42 may include a temperature sensor configured for sensing the actual temperature of the brake rotor, a speed sensor for sensing an angular velocity of the brake rotor 26, a torque sensor for sensing the braking torque applied to the brake rotor 26, an accelerometer for sensing acceleration of the brake rotor 26, or some other sensor for sensing some other form of data.

The computer 34 is in communication with the at least one sensor 42. The computer 34 is configured to receive data related to the disc braking system 24 from one or more of the sensors 42 of the vehicle 20. The computer 34 may be directly linked to the sensors 42 to directly receive the data. Alternatively, the computer 34 may receive the data indirectly from some other control system of the vehicle 20.

The software 40 processes the sensed data, i.e., the data received from the sensors 42, to compare an actual temperature of the brake rotor 26 with the critical temperature of the brake rotor 26. If the vehicle 20 includes a temperature sensor for directly sensing the actual temperature of the brake rotor 26, then the software 40 simply compares the sensed actual temperature with the critical temperature to determine which of the actual temperature and the critical temperature is the greatest. Alternatively, the software 40 may utilize other forms of data to determine, i.e., estimate, the actual temperature of the brake rotor 26. Accordingly, the software 40 may be operable to solve an equation to calculate the actual temperature of the brake rotor 26. One equation utilized to calculate the actual temperature of the brake rotor 26 is set forth below as a first order dynamic equation in Laplace form as Equation 1, $$\frac{T}{P} = \frac{\frac{1}{(C_p M)}}{(s + \mu_{rotor})} \qquad 1)$$

wherein: T is the actual temperature of the brake rotor 26, P is the input braking power of the disc braking system 24, $C_p$ is the specific heat capacity of the brake rotor 26, M is the effective mass of the brake rotor 26, s is a complex number of the Laplace Transform, and $\mu_{rotor}$ is the cooling coefficient of the brake rotor 26.

Equation 1 may also be expressed as Equation 2 in the following discrete time form (where t is the sample interval), at iteration n, $$T(n+1) = T(n) + \Delta t \left( \frac{\tau \omega}{C_p M} - \mu_{rotor}(T(n) - T_{ambient}) \right) \qquad 2)$$

wherein T(n+1) is the actual temperature of the brake rotor 26 at iteration n plus 1, T(n) is the actual temperature of the brake rotor 26 at iteration n, $\Delta t$ is the change in the time interval between iteration (n) and iteration (n+1), T is the braking torque applied by the disc braking system 24 to the brake rotor 26, $\omega$ is the angular velocity of the brake rotor 26, $\mu_{rotor}$ is the cooling coefficient of the brake rotor 26, and $T_{ambient}$ is the ambient air temperature adjacent the vehicle 20.

If the computer 34 determines that the actual temperature of the brake rotor 26 is greater than the critical temperature of the brake rotor 26, then the computer 34 applies a corrective measure to reduce the actual temperature of the brake rotor 26 to below the critical temperature of the brake rotor 26. The corrective measure is applied to prevent damage, such as warping, to the brake rotor 26 when the actual temperature of the brake rotor 26 is greater than the critical temperature of the brake rotor 26.

The corrective measure may include any measure taken that may directly or indirectly lead to decreasing the actual temperature of the brake rotor 26. The corrective measure may include, but is not limited to, displaying a warning to the operator of the vehicle 20, automatically scheduling maintenance for the disc braking system 24, decreasing the brake torque applied to the brake rotor 26, or some other measure that may ultimately lead to the reduction in the temperature of the brake rotor 26. For example, if the vehicle 20 is equipped with a traction control system that selectively applies brake torque to the wheels 22 of the vehicle 20 to maintain control of the vehicle 20, the corrective measure may include the computer 34 being operable to adjust the operation of the traction control system to apply the braking torque to other wheels 22 on the vehicle 20 to thereby lower the actual temperature of the brake rotor 26. Additionally, the vehicle 20 may be equipped with a display 44 configured for displaying the warning message, wherein the corrective measure includes displaying a message on the display 44 to indicate, for example, the actual temperature of the brake rotor 26 is greater than the critical temperature of the brake rotor 26, the disc braking system 24 is in need of maintenance, an instruction directing the operator to continue driving the vehicle 20 to supply the brake rotor 26 with a flow of air to cool the brake rotor 26, or some other instruction or warning intended to ultimately reduce the temperature of the brake rotor 26.

Referring to FIG. 3, the invention also provides a method of maintaining the brake rotor 26 of the disc braking system 24. The method includes defining the critical temperature of the brake rotor 26, indicated at 46. As described above, the critical temperature is the temperature above which damage to the brake rotor 26 may occur. The critical temperature may be defined at a temperature slightly below the temperature at which damage may occur to provide a safety factor to the system.

The method further includes determining the actual temperature of the brake rotor 26, indicated at 48. If the vehicle 20 is equipped with the temperature sensor for sensing the actual temperature of the brake rotor 26, then determining an actual temperature of the brake rotor 26 may further be defined as sensing the actual temperature of the brake rotor 26.

If the vehicle 20 is not equipped with the temperature sensor, then determining the actual temperature of the brake rotor 26 may further be defined as calculating the actual temperature of the brake rotor 26. Calculating the actual temperature of the brake rotor 26 may further be defined as calculating the actual temperature of the brake rotor 26 in response to occurrence of an event. The event may include, but is not limited to, the application of the disc braking system 24, the lapse of a pre-determined time interval, the application of one or more of the other control systems of the vehicle 20, or some other event that may indicate that the temperature of the brake rotor 26 should be monitored.

The method may further include sensing data related to the disc braking system 24 necessary to calculate the actual temperature of the brake rotor 26, indicated at 50. As described above, the data sensed may include a brake torque applied to the brake rotor 26, an angular velocity of the brake rotor 26, a time interval, or some other data utilized by the computer 34 to calculate the actual temperature of the brake rotor 26.

Calculating the actual temperature of the brake rotor 26 may further be defined as solving an equation to calculate the actual temperature of the brake rotor 26. As described above, the equation the computer 34 solves may include the equation $$\frac{T}{P} = \frac{\frac{1}{(C_p M)}}{(s + \mu_{rotor})}$$

wherein: T is the actual temperature of the brake rotor 26, P is the input braking power of the disc braking system 24, $C_p$ is the specific heat capacity of the brake rotor 26, M is the effective mass of the brake rotor 26, s is a complex number of the Laplace Transform, and $\mu_{rotor}$ is the cooling coefficient of the brake rotor 26. It should be appreciated that some other equation may also be utilized and solved by the computer 34 to calculate the actual temperature of the brake rotor 26, which utilizes other sensed data and material properties of the brake rotor 26 to calculate the actual temperature of the brake rotor 26.

The method further includes comparing the determined actual temperature of the brake rotor 26 to the defined critical temperature of the brake rotor 26, indicated at 52. The actual temperature of the brake rotor 26 is compared to the critical temperature of the brake rotor 26 to determine which of the actual temperature of the brake rotor 26 and the critical temperature of the brake rotor 26 is greater.

If the critical temperature of the brake rotor 26 is greater than the actual temperature of the brake rotor 26, then no action is taken, indicated at 54. However, if the actual temperature of the brake rotor 26 is greater than the critical temperature of the brake rotor 26, then the method further includes applying a corrective measure to prevent damage to the brake rotor 26, indicated at 58. Applying the corrective measure may further be defined as indicating potential overheating of the brake rotor 26, indicated at 60, displaying a warning message, indicated at 62, or sending a message to schedule maintenance, indicated at 64.

If the vehicle 20 includes at least one control system, such as a traction control system, then the method may further include determining if the at least one control system is operating, indicated at 66. If the at least one control system is operating, then the corrective measure may include adjusting the at least one control system to reduce the actual temperature of the brake rotor 26, indicated at 68. As described above, the control system may include, for example, a stability control system, a traction control system, an anti-lock braking system, or some other similar system, and adjusting the control system may include, for example, reducing the brake torque applied to the brake rotor 26 to reduce the actual temperature of the brake rotor 26.

While the best modes for carrying out the invention have been described in detail, those familiar with the art to which this invention relates will recognize various alternative designs and embodiments for practicing the invention within the scope of the appended claims.

The invention claimed is:

1. A method of maintaining a brake rotor of a disc braking system of a vehicle, the method comprising:
   determining an actual temperature of the brake rotor by solving an equation to calculate the actual temperature of the brake rotor, wherein the equation is:

$$\frac{T}{P} = \frac{\frac{1}{(C_p M)}}{(s + \mu_{rotor})}$$

wherein: T is the actual temperature of the brake rotor, P is the input braking power of the disc braking system, $C_p$ is the specific heat capacity of the brake rotor, M is the effective mass of the brake rotor, s is a complex number of a Laplace Transform, and $\mu_{rotor}$ is the cooling coefficient of the brake rotor;
   comparing the determined actual temperature of the brake rotor to a defined critical temperature of the brake rotor to determine which of the actual temperature of the brake rotor and the critical temperature of the brake rotor is greater; and
   applying a corrective measure to prevent damage to the brake rotor when the actual temperature of the brake rotor is greater than the critical temperature of the brake rotor.

2. A method as set forth in claim 1 wherein determining the actual temperature of the brake rotor is further defined as calculating an actual temperature of the brake rotor in response to occurrence of an event.

3. A method as set forth in claim 2 wherein calculating an actual temperature of the brake rotor in response to occurrence of an event is further defined as calculating an actual temperature of the brake rotor in response to application of the disc braking system.

4. A method as set forth in claim 2 wherein calculating an actual temperature of the brake rotor in response to occurrence of an event is further defined as calculating an actual temperature of the brake rotor in response to lapse of a pre-determined time interval.

5. A method as set forth in claim 1 further including sensing data related to the disc braking system necessary to calculate the actual temperature of the brake rotor.

6. A method as set forth in claim 5 wherein sensing data related to the disc braking system is further defined as sensing a torque applied to the brake rotor.

7. A method as set forth in claim 5 wherein sensing data related to the disc braking system is further defined as sensing an angular velocity of the brake rotor.

8. A method as set forth in claim 1 wherein applying a corrective measure is further defined as indicating potential overheating of the brake rotor.

9. A method as set forth in claim 1 wherein the vehicle includes at least one control system and the method further includes determining if one of the at least one control system is operating.

10. A method as set forth in claim 9 further comprising adjusting the at least one control system to reduce the actual temperature of the brake rotor.

11. A method as set forth in claim 1 wherein applying a corrective measure is further defined as sending a message to schedule maintenance.

12. A method as set forth in claim 1 wherein applying a corrective measure is further defined as displaying a warning message.

13. A vehicle comprising:
a disc braking system including a brake rotor;
at least one sensor configured for sensing data related to the disc braking system;
a computer in communication with said at least one sensor and including software operable thereon and configured for receiving the sensed data related to the disc braking system;
wherein said software is operable to solve an equation to calculate an actual temperature of said brake rotor;
wherein said equation is:

$$\frac{T}{P} = \frac{\frac{1}{(C_p M)}}{(s + \mu_{rotor})}$$

wherein: T is the actual temperature of the brake rotor, P is the input braking power of the disc braking system, $C_p$ is the specific heat capacity of the brake rotor, M is the effective mass of the brake rotor, s is a complex number of a Laplace Transform, and $\mu_{rotor}$ is the cooling coefficient of the brake rotor;
wherein said software processes the sensed data to compare the calculated actual temperature of the brake rotor with a critical temperature of the brake rotor; and
wherein said computer applies a corrective measure to reduce the actual temperature of said brake rotor to below the critical temperature of said brake rotor to prevent damage to said brake rotor when the actual temperature of said brake rotor is greater than the critical temperature of said brake rotor.

14. A vehicle as set forth in claim 13 further comprising a traction control system, wherein said corrective measure includes said computer being operable to adjust said traction control system to lower the actual temperature of said brake rotor.

15. A vehicle as set forth in claim 13 further comprising a display configured for displaying a warning message, wherein said corrective measure includes displaying a message on said display to indicate said actual temperature of said brake rotor is greater than the critical temperature of said brake rotor.

* * * * *